(12) United States Patent
Phillips et al.

(10) Patent No.: US 6,488,809 B1
(45) Date of Patent: *Dec. 3, 2002

(54) RESIN-TREATED MERCERIZED FIBERS AND PRODUCTS THEREOF

(75) Inventors: Arthur F. Phillips, Memphis, TN (US); Susan L. H. Crenshaw, Memphis, TN (US); Ellen A. Grimes, Cordova, TN (US); Whitten R. Bell, Memphis, TN (US)

(73) Assignee: BKI Holding Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/634,571

(22) Filed: Aug. 9, 2000

Related U.S. Application Data

(62) Division of application No. 09/163,040, filed on Sep. 29, 1998, now Pat. No. 6,171,441.

(51) Int. Cl.⁷ .................................................. D21C 9/00
(52) U.S. Cl. .......................... 162/9; 162/90; 162/164.1; 162/158; 162/135; 162/157.6; 162/168.1; 210/143; 428/191; 428/192; 428/193; 428/222; 428/299; 428/301; 8/125; 8/115.51

(58) Field of Search ........................... 162/9, 90, 164.1, 162/158, 135, 157.6, 168.1, 183; 210/143; 428/191–5, 222, 299, 301, 326; 8/125, 115.51

(56) References Cited

U.S. PATENT DOCUMENTS 5,858,021 A * 1/1999 Sun et al. ....................... 8/125
5,935,383 A * 8/1999 Sun et al. ..................... 162/158

* cited by examiner

*Primary Examiner*—Steven P. Griffin
*Assistant Examiner*—Mark Halpern
(74) *Attorney, Agent, or Firm*—Darby & Darby

(57) ABSTRACT

This invention relates to the process of manufacture of resin treated mercerized cellulose fibers and fibrous products prepared therefrom and is directed particularly to a method of improving permeability and bulking properties and reducing water retention value (WRV) of a conventional high permeability bulk pulp. The invention also includes the improved cellulose fibers, cellulosic sheet materials containing said fibers, and products therefrom (such as automotive oil and air filters).

21 Claims, 7 Drawing Sheets

FIGURE I

RESIN-TREATED MERCERIZED FIBERS AND PRODUCTS THEREOF

This is is a division of application Ser. No. 09/163,040, filed Sep. 29, 1998, now U.S. Pat. No. 6,171,441.

FIELD OF THE INVENTION

This invention relates to a process for manufacture of resin-treated, mercerized cellulose fibers and fibrous products prepared therefrom and is directed particularly to a method of improving permeability and bulking properties and reducing the water retention value (WRV) of a mercerized, high porosity bulk pulp. The invention also includes the improved cellulose fibers, cellulosic sheet materials containing said fibers, and products manufactured therefrom (such as automotive oil and air filters).

BACKGROUND OF THE INVENTION

Cellulose fibers currently available in the market do not exhibit all desired properties for use in certain applications. For example, in the manufacture of automotive oil and air filters, it is desirable that the fibers exhibit reduced WRV and produce structures (e.g., filters) with high permeability and bulk with adequate sheet strength. However, one commercially available fiber produces structures with high permeability and bulk but does not have adequate sheet strength. Another commercially available fiber produces structures with higher permeability and bulk, but is brittle and loses permeability under conventional refining conditions. Another commercially available fiber produces structures with high permeability and bulk, but has an undesirably high WRV. Thus, there is a need in the art for improved cellulose fibers having reduced WRV that can produce structures with high permeability and bulk.

Attempts have been made to improve conventional manufacturing processes to obtain cellulose fibers of desired properties. For example, Shaw et al. describe in U.S. Pat. No. 3,819,470 that swellability, which is a result of water absorption, can be reduced by treating fibers with a substantive polymeric compound and fluff-drying. Adjusting parameters for improving quality of cellulose fibers are described in U.S. Pat. No. 3,756,913 to Wodka; U.S. Pat. No. 4,361, 463 to Lindberg et al.; U.S. Pat. No. 4,853,086 to Graef; U.S. Pat. No. 2,926,116 to Keim et al.; and U.S. Pat. Nos. 5,200,036 and 5,015,245 to Noda. All patents (and references therein) cited herein are incorporated by reference. However, cellulose fibers that exhibit the desired properties as described herein have not been previously reported.

SUMMARY OF THE INVENTION

It has now been surprisingly discovered that fibers (and fiber structures produced thereof) with improved permeability and bulking properties and reduced water retention value (WRV) may be obtained in a process that combines mercerization of cellulose fibers and treatment with a low molecular weight, water dispersible polymer. The combination of these two steps results in cellulose fibers with low WRV (water retention value), and good tolerance to refining (non-brittleness) that provide exceptional properties to fiber structures or products such as high permeability and high bulk.

The invention thus relates to a process of manufacture of resin-treated, mercerized cellulose fibers and fibrous products prepared therefrom which have improved properties in comparison to a conventional high porosity bulk pulp.

In another aspect, the invention relates to resin-treated, mercerized cellulose fibers and fibrous products having high permeability, high bulk, low WRV, and good tolerance to refining.

In yet another aspect, the present invention relates to high flow filters such as automotive oil and air filters prepared from the resin-treated, mercerized cellulose fibers of the invention.

DETAILED DESCRIPTION OF THE INVENTION

Figure 1:
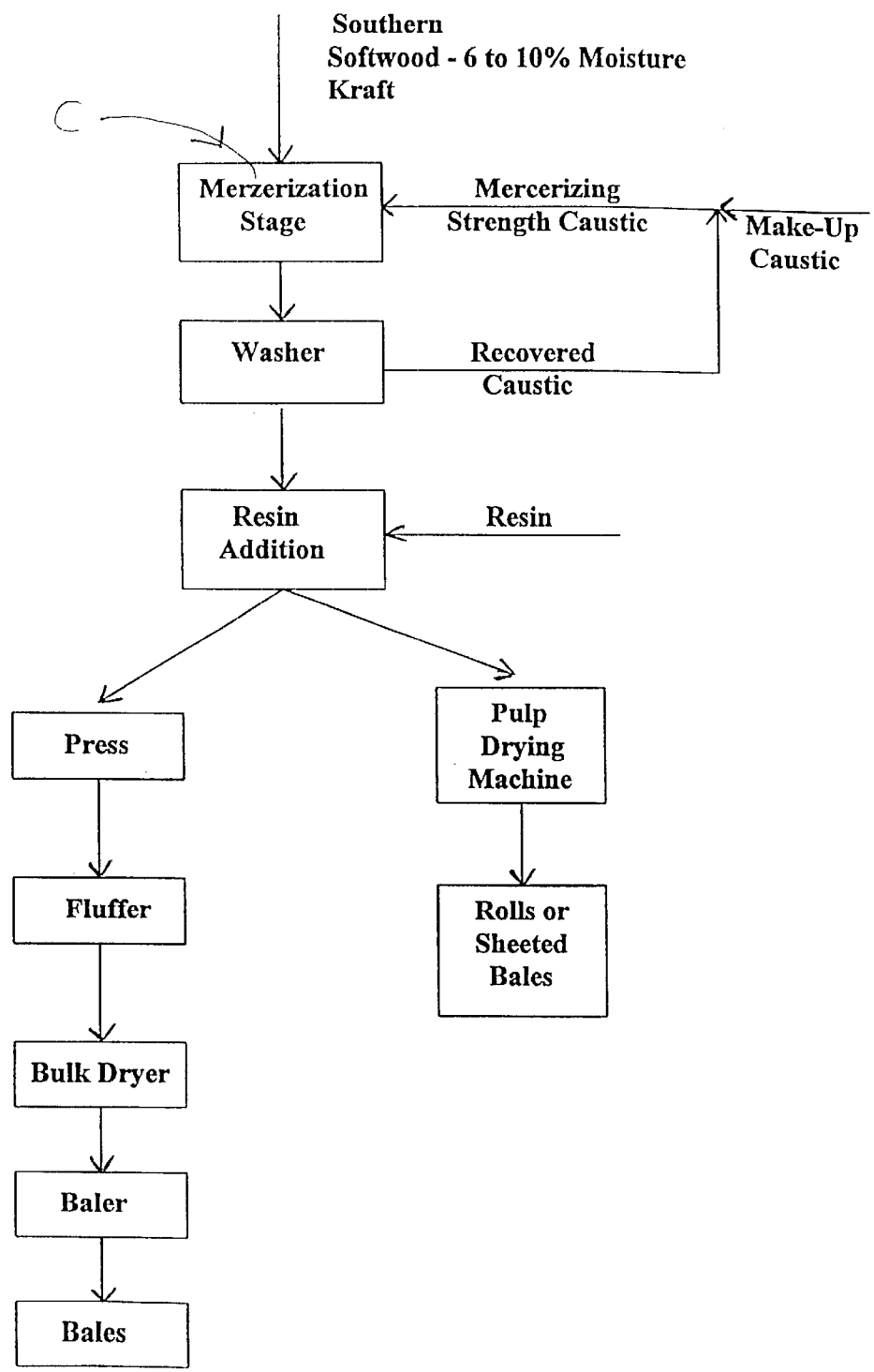
FIG. 1 is a process flow diagram of one embodiment of the present invention.

The invention relates to a process for manufacturing resin-treated mercerized cellulose fibers and fibrous products prepared therefrom. The process includes the steps of treating cellulose fibers with mercerizing strength caustic, for example 18% NaOH (or another swelling agent), followed by treatment with a low molecular weight, water dispersible polymer, for example a polyamide epichlorohydrin adduct (PAE). A process flow diagram of one embodiment of the present method is illustrated in FIG. 1.

The process of the invention may be used with any cellulosic fiber source and mixtures thereof to improve permeability, refinability, and WRV. Examples of preferred fibers are SSK (Southern Softwood Kraft), NSK (Northern Softwood Kraft), HK (Tropical Hardwood Kraft), cotton linter cellulose, NSS (Northern Softwood Sulfite), and SSS (Southern Softwood Sulfites).

Methods for mercerizing cellulose pulp are generally known in the art. For example, pulp can be mercerized according to any suitable method of caustic treatment at low, medium and high consistency. Generally, pulp is treated under agitation with caustic at a concentration of 80 grams/liter (g/l) or higher, at a temperature of about 20° C. or higher. The preferred caustic is sodium hydroxide. Potassium hydroxide may also be used. During this treatment, the cellulose fibers swell considerably and a portion of the hemicellulose associated with the cellulose is dissolved. The pulp is subsequently neutralized and washed. The resulting fibers are no longer straight but are bent, curled, swollen and more porous. The step of mercerization and the effect of caustic on the cellulose fiber is further described in, for example, Rydholm, ed; *Pulping Processes* (Interscience Publishers, 1965) and Ott, Spurlin and Grafflin, eds; *Cellulose and Cellulose Derivatives,* Vol V, Part I (Interscience Publishers, 1954) which are incorporated herein by reference.

Fibers can be mercerized to different degrees before they are treated with resin. It is within the skill of those of ordinary skill in the art to optimize the degree of mercerization. For example, Frazier permeability of an unpressed TAPPI handsheet may be used as an indicator of a desired degree of mercerization. Mercerized cellulose is also known as "hydrate cellulose" and the two terms are used here interchangeably.

Resin treatments generally known in the art can be used in combination with the mercerization step of the invention. Any low molecular weight, water dispersible polymer may be used in the present method. For example, low molecular weight polymer resins that polymerize in the presence of heat, such as urea and melamine formaldehydes, can be used. In a preferred embodiment of the invention, a cationic wet-strength resin such as polyamide epichlorohydrin adduct (PAE) is used.

The amount of resin that is used in the invention is generally low, for example between 0.1 and 0.6 wt solids % of dry pulp, compared to the amount of resin generally employed for producing resin-treated bulking fibers as taught in U.S. Pat. No. 3,756,913 to Wodka and U.S. Pat. No. 5,399,240 to Graef. In another embodiment, the amount of resin may be up to 1.0 wt solids % of dry pulp. Such low concentrations are sufficient only when the cellulose fibers are pre-mercerized. Low resin concentrations have the advantage of preventing formation of non-repulpable knots and pills which can be a serious problem with certain commercially available resin-treated fibers. However, resin can also be applied in a concentration of up to 1.5% or more. The preferred concentration of resin will depend on the resin used and the degree of mercerization achieved. One skilled in the art can determine a suitable concentration based on the following considerations. The amount of resin used should improve permeability, WRV and bulk of the pre-mercerized fiber while somewhat maintaining its strength relative to its permeability. Also, the concentration of resin used should be low enough to avoid formation of non-repulpable knots and pills in a sheet containing resin treated pulp after it is refined.

In one preferred embodiment, the method of the invention includes the following steps:

1. Feeding pulp of 94 to 90% starting consistency to a mercerization stage where mercerizing strength caustic is introduced to produce a low consistency slurry (consistency is defined as wt % fiber in water);
2. washing the resulting caustic containing pulp using a counter current washer to recover some strong caustic and provide washed, mercerized pulp;
3. introducing to the pulp a polyamide epichlorohydrin adduct (PAE) (a cationic wet strength resin), at 0.1 to 1.5% wt % of dry pulp in dilution water which also contains sulfuric acid to adjust the pulp pH to about 5.5 to 6.5;
4a. drying the pulp by pressing the pulp to about 45 to 50% consistency and subjecting it to fluffing to individualize the fibers which may have clumped together; and heating to about 300° F. in a tunnel dryer to dry the pulp and cure the (PAE) resin; or
4b. drying the pulp using a pulp drying machine to produce a sheeted product with sufficient heat to cure the resin.

According to another aspect of the invention, fibers may be pre-mercerized, formed into sheets or bulk-dried, then repulped and treated with resin, and subsequently re-dried in a bulk or sheet form.

The resin-treated, mercerized fibers prepared according to the method of the present invention have increased permeability (CFM/ft$^2$ of a standardized handsheet), decreased water retention value and increased bulk. Furthermore, resin-treated mercerized fibers can be made at a lower cost than non-resin treated, mercerized fibers of equal permeability properties because the amount of caustic used can be reduced in some cases by as much as 40% while the beaten, unpressed TAPPI handsheet permeability can be restored to its original level by the addition of about 0.4% PAE resin based on bone dry (b.d.) pulp weight.

The fibers prepared according to the present invention can be used in a number of ways as will be recognized by those skilled in the art. One preferred use is in the automotive industry for manufacturing air and oil filters. Such filters can be made by methods well known in the art. Generally, the mercerized, resin-treated fibers of the present invention can be blended with other commercially available fibers, and filter paper made using conventional machinery such as, for example, a low consistency inclined wire paper machine. The fibers of the present invention can also be used to prepare bulking tissue for use, for example, for making diapers.

The improved properties of cellulose fibers prepared according to this invention are illustrated in the following non-limiting examples.

EXAMPLES

Example 1

To determine properties of the cellulose fibers prepared according to the present invention, test materials listed in Table 1 were prepared.

Experimental Fiber 1, was prepared as follows. Never-dried southern softwood kraft pulp was mercerized in a low consistency process as described above, washed, then treated with 0.6% Kymene 557H wet-strength resin (PAE) solids on a dry pulp basis, centrifuged, air dried to 50 to 55% consistency, fluffed and placed in a static oven at 105° C. overnight.

Kymene 557H resin was obtained from Hercules Inc., Wilmington, Del. Kymene 557H, a registered trademark of Hercules, is a polyamide epichlorohydrin (PAE) resin which is prepared by reacting adipic acid and diethylene triamine monomers to form a polymer which is then reacted with epichlorohydrin to generate a final product which is a complex mixture of polymers.

Experimental Fiber 2, was prepared as follows. A sheet-dried, mercerized southern softwood kraft pulp was repulped in water to low consistency and treated with 0.6% Kymene 557H solids on a dry pulp basis, centrifuged, fluffed, dried in a through-air tunnel dryer at 275° F. for 5 to 8 minutes and then baled.

Experimental Fiber 3, was prepared as follows. Never-dried southern softwood kraft pulp was mercerized in a low consistency process, washed, then treated with 1.0% Kymene 557H solids on a dry pulp basis, formed into a sheet, wet pressed using a felt, dried on a dryer train to approximately 0–3% moisture, then placed in a static oven at 105° C. overnight.

Experimental Fiber 4, was prepared as follows. Never dried southern softwood kraft pulp was mercerized in a high consistency process, washed, then treated with 0.4% Kymene 557H solids on a dry pulp basis, pressed to 40 to 45% consistency, fluffed, and dried in a through-air tunnel dryer at 300° F. for 5 to 8 minutes and then baled.

Experimental Fiber 5, was prepared as follows. Foley Fluff, a commercially available southern softwood kraft pulp (available from Buckeye Technologies, Inc., Memphis, Tenn.) was repulped in water, centrifuged, mercerized in a low consistency process, washed, then treated with 1.0% Kymene 557H solids on a dry pulp basis, centrifuged, air dried to 50 to 55% consistency, fluffed, and placed in a through-air dryer at 300° F. for 10 minutes.

Experimental Fiber 6, was prepared as follows. A bulk-dried, mercerized southern softwood kraft pulp was repulped in water and treated with 1.0% Kymene 557H solids on a dry pulp basis, centrifuged, fluffed, and placed in a static oven at 105° C. for 8 hours.

Properties of experimental fibers were compared with properties of four control fibers. Control Fiber 1 was sheet-dried, mercerized SSK pulp, Control Fiber 2 was bulk-dried, mercerized SSK, Control Fiber 3 was non-mercerized, sheet-dried SSK and Control Fiber 4 was non-mercerized, resin-treated bulk-dried SSK.

Handsheets were made from each fiber according to TAPPI Method T205 except that a 0.5% consistency slurry was used during the disintegration step and the handsheets were not pressed. Samples were refined according to TAPPI Method T248 before unpressed handsheets were made.

The following properties were measured on the unpressed handsheets: unrefined and refined permeability ($cfm/ft^2$), and unrefined and refined tensile values (g/in). WRV (%) measurements were made on fibers.

Unrefined and refined permeability and tensile values were determined using standard procedures generally known in the art. Tensile values were determined using TAPPI Method T494. Permeability was determined using an air permeability tester. Specifically, four handsheets per experimental fiber were tested in the air permeability tester. For each handsheet a pressure drop of one half inches of water was established across the handsheet and air flow through the sheet was measured by the pressure drop across an orifice indicated on a vertical manometer. The average manometer reading was converted to air permeability using conversion tables.

Water retention values were determined using the following procedure. Briefly, dry samples were subdivided to ensure that a slurry be easily obtained upon wetting. Wet samples that were partially dewatered were weighed. Samples were subjected to swelling for 16 to 24 hours. Swollen samples were centrifuged at 1500 g. The moist, centrifuged samples were weighed, dried at 105±2° C. and reweighed. The water retained in the samples after centrifugation was primarily retained due to swelling. Generally, some surface or occluded water remains after centrifugation and, therefore, to ensure comparable WR values, standardized conditions were maintained.

TABLE I

Unpressed Tappi Handsheet Properties

| Material Description | Unrefined Permeability | Refined Permeability ($cfm/ft2$) | | Unrefined Tensile (g/in) | Refined Tensile (g/in) | | Bulk (cc/g) | WRV (%) | |
|---|---|---|---|---|---|---|---|---|---|
| | | 500 revs | 1000 revs | | 500 revs | 1000 revs | 500 revs | 500 revs | 1000 revs |
| Control Fiber 1 (Sheet-dried, mercerized SSK) | 308 | 311 | 315 | 92 | 182 | 297 | 6.6 | 103.2 | 109.9 |
| Control Fiber 2 (Bulk-dried, mercerized SSK) | 456 | 368 | 352 | 50 | 231 | 376 | 7 | 107.4 | 114.6 |
| Control Fiber 3 (Sheet-dried SSK) | 70 | 64 | 51 | 1034 | 2283 | 3284 | 3.9 | 118.1 | 132.1 |
| Control Fiber 4 (Bulk-dried, resin-treated SSK) | 479 | 291 | 250 | 10 | 101 | 191 | 8.1 | 67.3 | 69.4 |
| Experimental Fiber 1 (Low cons. mercerized SSK Resin treated-Bulk dried) | 753 | 622 | 501 | 9 | 14 | 33 | 7.8 | 96.8 | 100.8 |
| Experimental Fiber 2 (Repulped merc. SSK Resin treated-Bulk dried) | >757 | 465 | 410 | 7 | 24 | 51 | 7.5 | 91 | 96.1 |
| Experimental Fiber 3 (Low cons. merc. SSK-Resin treated-Sheet dried) | 586 | 434 | 404 | 9 | 29 | 71 | 6.2 | — | — |
| Experimental Fiber 4 (High cons. merc. SSK-Resin treated-Bulk dried) | 717 | 351 | 326 | 16 | 100 | 218 | 6.8 | 105.7 | 111.1 |
| Experimental Fiber 5 (Dried SSK low cons. mercerized Resin treated-Bulk dried) | >757 | 504 | 455 | 10 | 18 | 25 | 7.8 | 87.9 | 94.6 |
| Experimental Fiber 6 (High cons. merc. SSK-Resin treated-Bulk dried) | >757 | 478 | 439 | 12 | 31 | 54 | 7.5 | 73.5 | 77.1 |

A detailed step-by-step procedure for determining WRV is outlined below.

Day 1
1. Shredding (by hand) a dry sample to increase the surface area as much as possible (if the sample is wet proceeding to step 2);
2. shaking vigorously 1 to 2 grams of the sample in a 250 ml Erlenmeyer flask with 100 ml deionized $H_2O$;
3. condition weighing flasks in an oven at 105±2° C. overnight.

Day 2
1. Removing weighing flasks from oven and placing in desiccator to cool for one hour;
2. weighing flasks before centrifuging;
3. filling funnels with samples and placing into centrifuge tubes; adjusting centrifuge speed to ensure that required acceleration is attained after 1 minute; centrifuging for 10 minutes;
4. allowing centrifuge to coast to a stop and then removing samples;
5. rapidly transferring centrifuged samples into a tared weighing bottles and reweighing;
6. placing samples in an oven at 105±2° C. overnight.

Day 3
1. Removing samples from oven, cooling in a desiccator for one hour and reweighing.

The above procedure is described in "The Determination of the Water Retention Capacity (Swelling Value) of Pulps", Theodor Hopner, Georg Jayme and Johannes C. Ulrich, *Das Papier*, Vol. 9, No. 19/20, 1955, pp. 476–482.

The WRV values were calculated according to the following formula.

$$WRV = \frac{(\text{Weight of wet centrifuged sample} - \text{weight of dry sample}) \times 100}{\text{Weight of dry sample}}$$

The rpm required for an acceleration of 1500 g was calculated as follows:

$$rpm = 299.05 \frac{\sqrt{1500}}{r}$$

r being the radius of the centrifuge measured from the middle of the axis of rotation to the constriction in the centrifuge tube for the stem of the funnel tube.

The results of this experiment are represented in Table 1.

Table 1 shows that Experimental Fibers 1, 2, 4, 5 and 6 each had increased porosity at a lower WRV in comparison to Control Fiber 2. Experimental Fibers 1, 2, 5, and 6 had increased porosity at a lower WRV in comparison to Control Fiber 1.

Experimental Fibers 1, 2, 5 and 6 had increased bulk compared to mercerized fibers such as Control Fiber 1 and Control Fiber 2 which were not treated with resin. The increased bulk remained within an acceptable range, in that the filter sheet was deemed likely to still fit within the existing filter canister dimensions, which is important for filter paper production. Generally, increased bulk is desirable because it increases filter capacity. However, pore size should remain within current limits set by the filtration manufacturers, since an increase in pore size causes a decrease in filter efficiency.

Example 2

Mercerized SSK fibers were treated with 1.0% Kymene 557H based on bone dry (b.d.) pulp weight as described in Example 1. Permeability, bulk and WRV of the treated fibers were compared with permeability, bulk and WRV of SSK fibers prepared according to a conventional method (i.e., with mercerization but without the addition of polymer) after subjecting the fibers to a refining step at several different amounts or degrees of refining (expressed in a total number of revolutions ["rev"]). Results are represented in FIGS. 2, 3, and 4.

Figure 2:
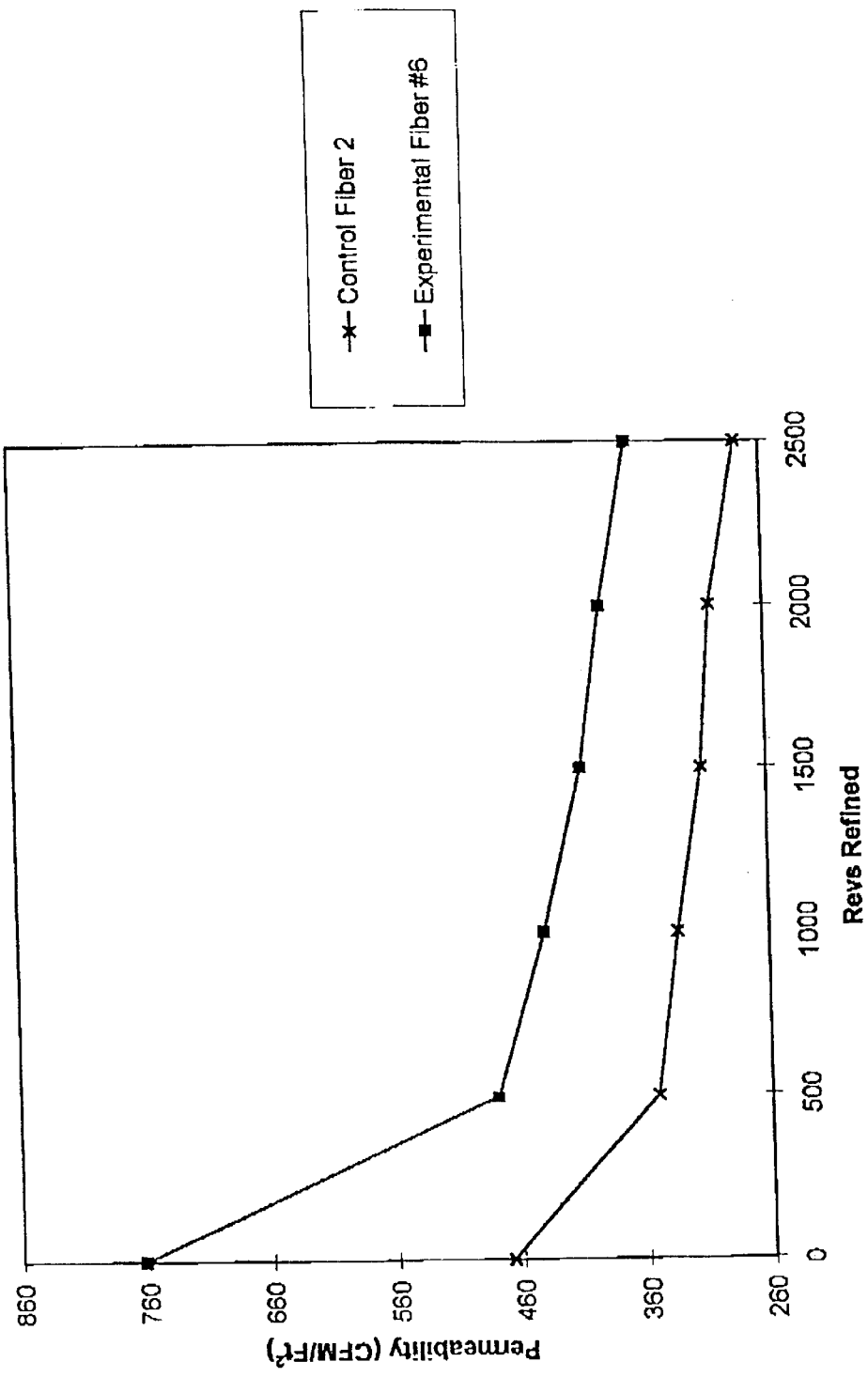
FIG. 2 is a graph showing comparative permeability between commercially available mercerized cellulose fibers and fibers treated according to one embodiment of the invention.

FIG. 2 shows that fibers prepared according to the method of the invention have higher permeability compared to fibers prepared according to conventional methods over a range of refining from 0 to 2500 rev.

Figure 3:
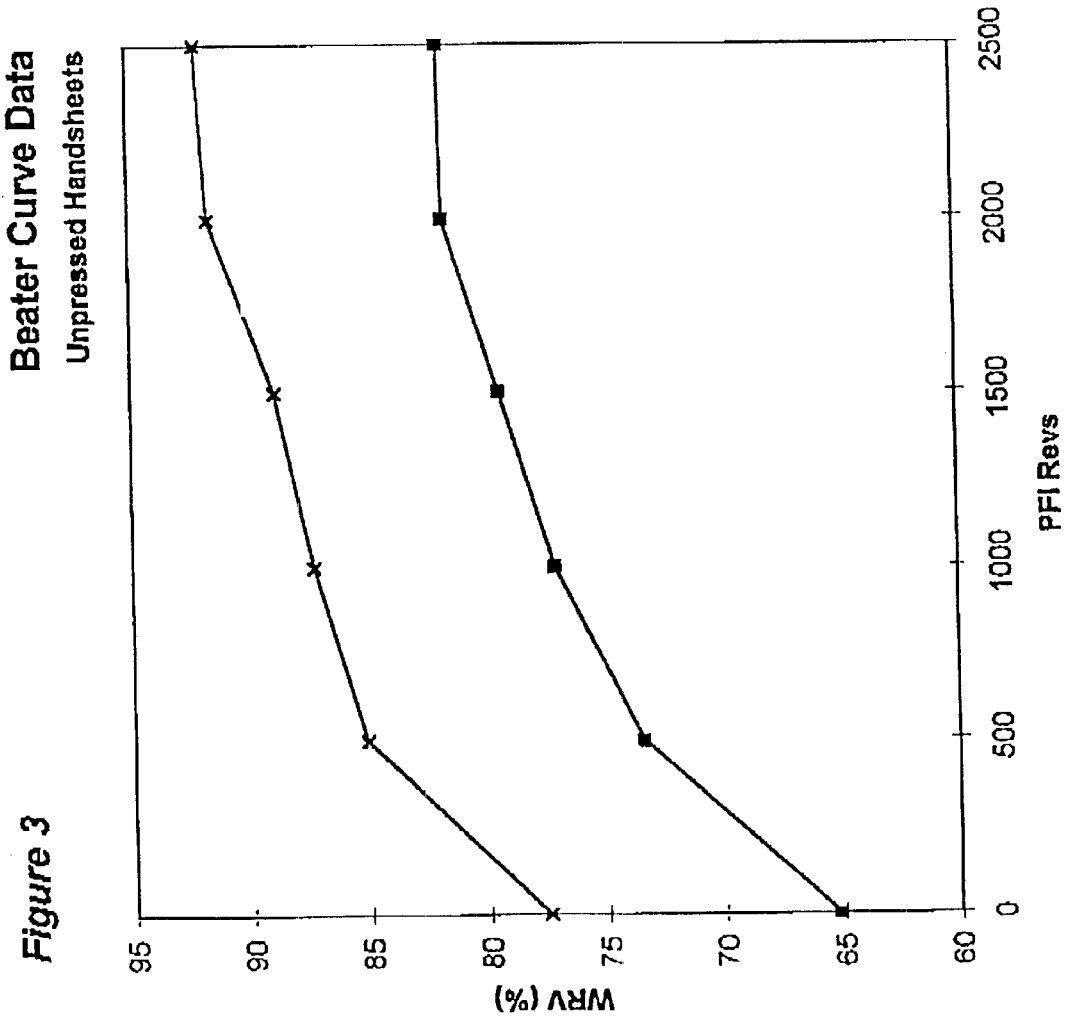
FIG. 3 is a graph showing comparative WRV data between commercially available mercerized cellulose fibers and fibers treated according to one embodiment of the invention.

FIG. 3 shows that fibers prepared according to the method of the invention have lower WRV values compared to fibers prepared according to conventional methods over a range of refining of from 0 to 2500 rev.

Figure 4:
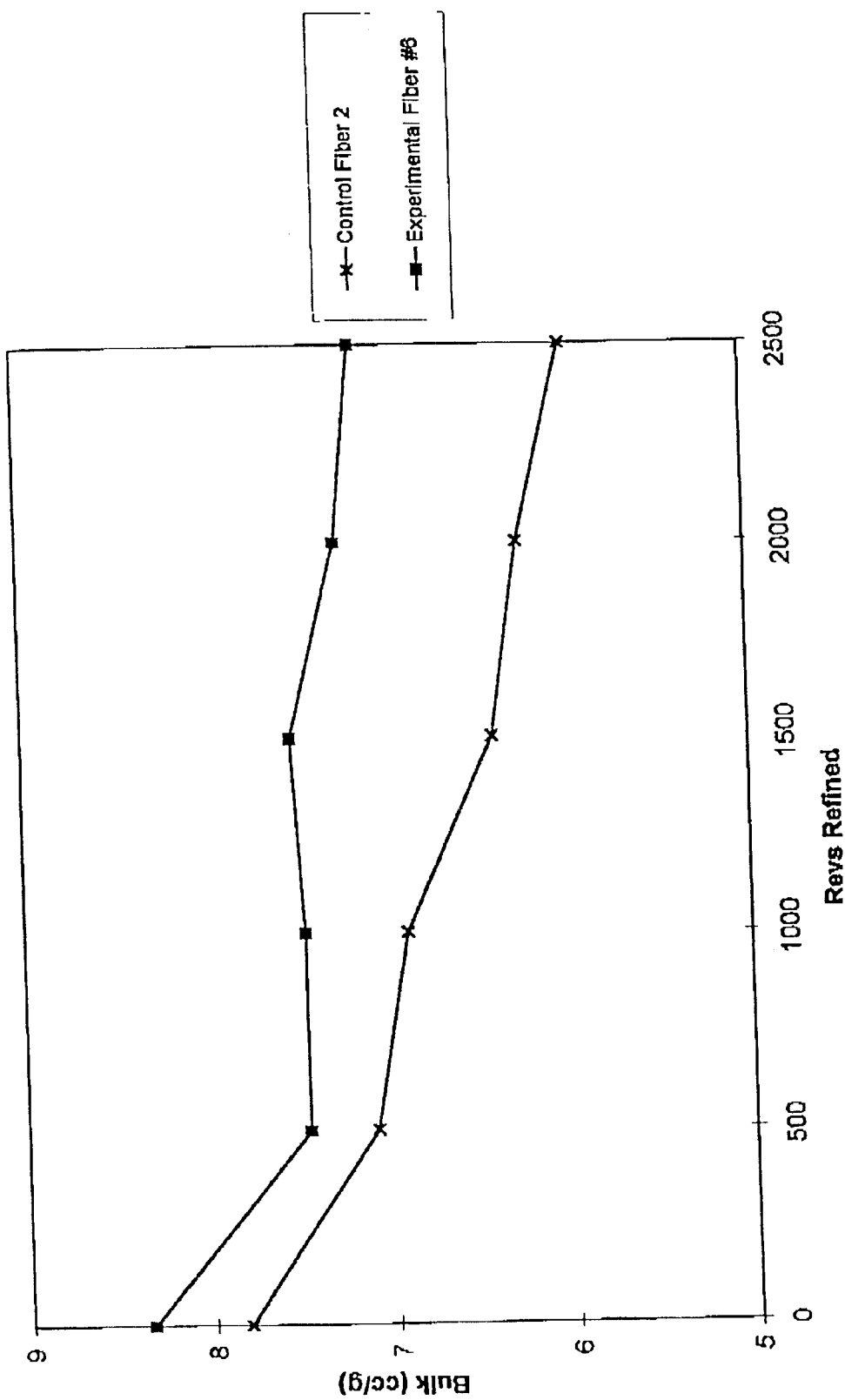
FIG. 4 is a graph showing comparative bulk data between commercially available mercerized cellulose fibers and fibers treated according to one embodiment of the invention.

FIG. 4 shows that fibers prepared according to the method of the invention have higher bulk than the fibers prepared according to conventional methods over a range of refining of from 0 to 2500 rev.

Example 3

Filter paper manufacturers generally achieve target paper properties. by blending different fibers. To determine the properties of blends containing fibers of the present invention, the following tests were performed.

A blend of 65% Experimental Fiber 4 and 35% Control Fiber 3 was prepared. Control Fiber 3 is a non-mercerized sheet-dried, southern softwood kraft pulp. Two control blends were prepared: a blend of 65% Control Fiber 2 and 35% Control Fiber 3 and a blend of 75% Control Fiber 1 and 25% Control Fiber 3. These control blends are typical for furnish blends run in the filter paper industry. The blends were refined using a PFI mill as described in TAPPI method T-248 to a target porosity of 100–115 $cfm/ft^2$ for a 100 $g/m^2$ sheet. The refining conditions were intended to simulate conical refining of a furnish blend in a filter manufacturing plant. Unpressed handsheets were made and tested for permeability, tensile value, density, WRV and pore size. The handsheets were weighing about 100 $g/m^2$ which is a typical filter sheet weight. Table 2 shows the test results.

Table 2 shows that unpressed handsheets containing a blend with Experimental Fiber 4 had similar pore size to the blends containing Control Fiber 2 and Control Fiber 1.

TABLE 2

|  | 35% Control Fiber 3 65% Experimental Fiber #4 Blend | 35% Control Fiber 3 65% Control Fiber 2 Blend | 25% Control Fiber 3 75% Control Fiber 1 Blend |
| --- | --- | --- | --- |
| Permeability (cfm/ft2) | 117 | 111 | 111 |
| Tensile (gm/in) | 712 | 1202 | 763 |
| Density (gm/cc) | 0.190 | 0.188 | 0.189 |
| WRV (%) | 105.5 | 104.2 | 101.0 |
| Pore Size (microns) | 31.69 | 32.81 | 33.92 |

Figure 5:
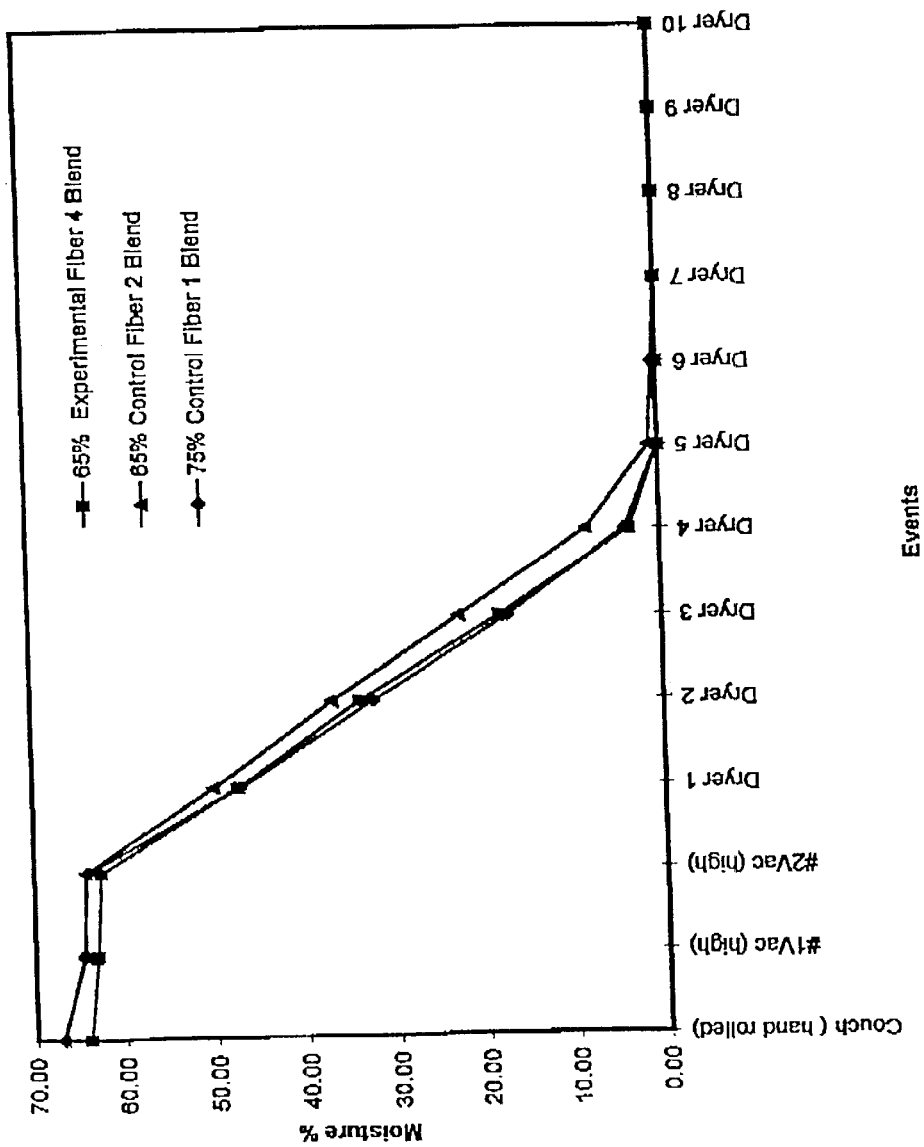
FIG. 5 is a graph showing comparative drying rate data between refined blends of commercially available mercerized cellulose fibers with non-mercerized fibers and a blend containing fibers treated according to one embodiment of the invention.

The above fiber blends were also tested for drying rate and the results are represented in FIG. 5 and Table 3. FIG. 5 shows that the blend of 65% Experimental Fiber 4 and 35% Control Fiber 3 dried at approximately the same rate as the blend of 75% Control Fiber 1 and 25% Control Fiber 3. The blend of 65% Experimental Fiber 4 and 35% Control Fiber 3 dried significantly faster than the blend of 65% Control Fiber 2 and 35% Control Fiber 3. For example, as evident from Table 3, a blend containing Experimental Fiber 4 contained 3.3% moisture at Dryer 4 while the Control Fiber 2 blend contained 8.14% moisture. Those skilled in the art will appreciate that a difference of nearly 5% moisture is significant, particularly in a filter manufacturing plant where the speed of a paper machine line for sheeting a refined furnish blend is based on the moisture of the sheet at the rewinding reel. It is well known that the sheet moisture must be controlled and should not exceed 5.0%. Under such conditions, even a 0.1% moisture reduction is significant.

TABLE 3

|  | 65% Exper. Fiber 4 % sheet moisture | 65% Control Fiber 2 % sheet moisture | 75% Control Fiber 1 % sheet moisture |
| --- | --- | --- | --- |
| Couch (hand rolled) | 63.97 | 67.15 | 67 |
| #1 Vac (high) | 63.00 | 64.45 | 64.64 |
| #2 Vac (high) | 62.52 | 64.32 | 64.08 |
| Dryer 1 | 47.30 | 50.00 | 47.01 |
| Dryer 2 | 33.66 | 36.76 | 32.23 |
| Dryer 3 | 18.00 | 22.52 | 17.07 |
| Dryer 4 | 3.30 | 8.14 | 3.77 |
| Dryer 5 | 0.00 | 0.98 | 0.00 |
| Dryer 6 | 0.00 | 0.49 | 0.49 |
| Dryer 7 | 0.00 | 0.00 | 0.00 |
| Dryer 8 | 0.00 | 0.00 | 0.00 |
| Dryer 9 | 0.00 | 0.00 | 0.00 |
| Dryer 10 | 0.00 | 0.00 | 0.00 |
| Bone Dry wt. | 2.05 | 2.03 | 2.04 |
| Revs. (pfl mll1) | 350 | 350 | 350 |

Example 4

To determine the properties of refined blends containing fibers of the present invention, and determine their suitability for filter manufacturing, the following tests were performed.

Figure 6:
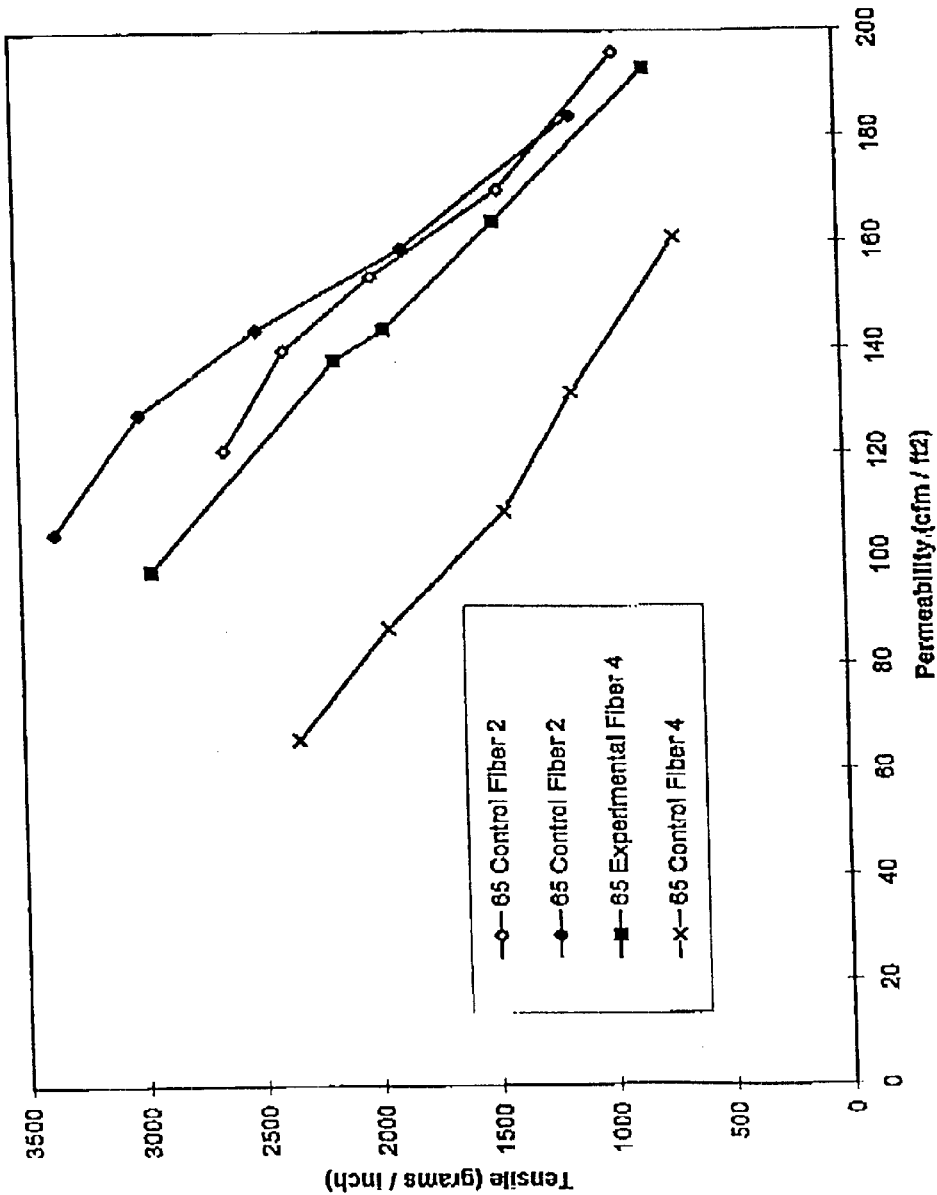
FIG. 6 is a graph comparing the tensile values at various permeability levels for refined blends of conventional mercerized cellulose fibers and unmercerized cellulose fibers, refined blends of conventional resin treated fibers and unmercerized cellulose fibers, and values for refined blends of fibers treated according to one embodiment of the invention and unmercerized cellulose fibers.
Figure 7:
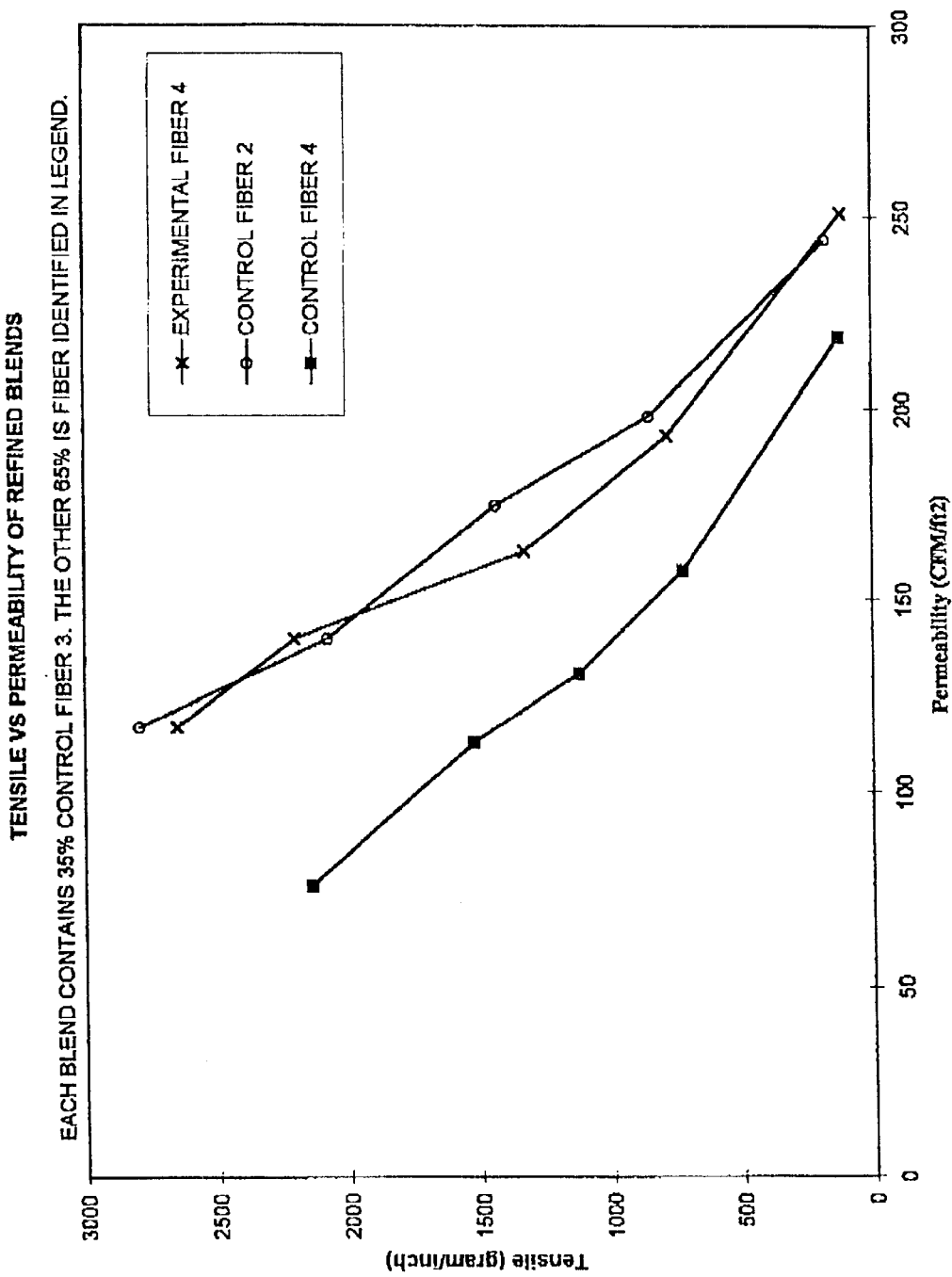
FIG. 7 is a graph comparing tensile values at various permeability levels between refined blends of conventional mercerized cellulose fibers and unmercerized cellulose fibers, refined blends of conventional resin-treated fibers and unmercerized cellulose fibers, and refined blends of fibers treated according to one embodiment of the invention and unmercerized cellulose fibers.

This experiment was conducted in two stages. In the first stage, an experimental blend of 65% Experimental Fiber 4 and 35% Control Fiber 3 and a control blend of 65% Control Fiber 2 and 35% Control Fiber 3 were prepared. In the second stage, a blend of 65% Control Fiber 4 and 35% Control Fiber 3, and a second control blend of 65% Control Fiber 2 and 35% Control Fiber 3 were prepared. The control blends were typical of furnish blends run in the filter paper industry. Samples of the blends were refined using a PFI mill as described in TAPPI method T-248 over a range of revolutions. Unpressed handsheets (weighing 60 g/m$^2$) were made and tested for blend Frazier porosity and tensile value for each degree of refining. The test was repeated using the blends as described, except that a single stage experiment was performed. The results are presented in FIGS. 6 (two-stage test) and 7.

Example 5

To demonstrate the improved permeability and bulking properties of the invention, the following samples were mercerized and resin treated: Northern Softwood Kraft, Eucalyptus, Southern Sulfite, Grade 512 Cotton Linter, and Southern Softwood Kraft.

To mercerize the fiber samples, each was repulped to 250 g b.d. wt. of the fiber in 18% NaOH and permitted to steep for 1 hour. The NaOH solution was then drained off and the sample was washed with water and neutralized with $H_2SO_4$ (adjusted to pH 6–7). The pulp was then slurried at 3.75% consistency.

To resin-treat each mercerized sample, 1% Kymene® 557H wet-strength resin (PAE) solids on a dry pulp basis was added to the slurry and allowed to remain for 20 minutes. For example, 10 g of the 12.5% solids Kymene (as received from the manufacturer) could be used to treat a 125 g sample. The slurry was centrifuged to approximately 50% consistency and adjusted by air drying. The treated pulp was fluffed through a two stage lab disintegrator. Fluffed fiber was then cured overnight in a lab oven at 105° C.

The permeability and bulk properties of each mercerized sample was compared before and after resin treatment. In each sample, Frazier permeability improved after resin treatment by approximately 1.8 to 2.5 times more than after mercerization alone, while bulk properties increased by as much as 18% (Eucalyptus). The improved permeability and increase in bulk of the resin-treated fibers permits better filtration capacity of filter paper made from the fibers.

TABLE 4

| FIBER SPECIES | After Mercerization Treatment | | After Mercerization and Resin Treatment | |
| --- | --- | --- | --- | --- |
|  | Frazier (CFM/ft2) | Bulk (cc/g) | Frazier (CFM/ft2) | Bulk (cc/g) |
| Southern Softwood Kraft | 389 | 7.7 | 697 | 8.2 |
| Northern Softwood Kraft | 175 | 7.4 | 345 | 8.2 |
| Southern Softwood Sulfite | 308 | 7.3 | 610 | 8 |
| Grade 512 Cotton Linter | 424 | 7.1 | >757 | 7.3 |
| Eucalyptus | 70 | 5.9 | 172 | 6.9 |

Example 6

This Example demonstrates the improved bulking, permeability, and tensile properties of a fibrous product treated with resin and mill refined according to methods of the present invention. Mercerized Southern Softwood Kraft was treated with various resins. Control Fiber 1 was mercerized Southern Softwood Kraft without resin treatment. Mercerization was performed as described in Example 1, except that resin-treated fibers were dried after mercerization in the present Example.

To resin treat the sample, three 200 g b.d. wt. portions of the mercerized fiber were repulped and slurried at 3.75% consistency. To prepare experimental samples, 1% Kymene 557H solids (PAE) (based on b.d. fiber weight) was added to the first slurry portion, 1% Parez 607 (modified melamine resin; Cytec Industries Inc., W. Paterson, N.J.) (based on b.d. fiber weight) was added to the second slurry portion, and 10% of a melamine-formaldehyde resin (based on b.d. fiber weight), as it was received from the manufacturer (BASF, Ludwigshafen, Germany), was added to the third slurry portion. Each batch portion was allowed to stay in the resin-containing slurry for 20 minutes. The slurry was centrifuged to approximately 50% consistency and adjusted by air drying. The treated pulp was fluffed through a two stage laboratory disintegrator, and cured in a laboratory oven at 105° C. overnight. The resin treated fiber samples were then tested for permeability bulk properties and tensile strength under mill refined conditions and without the conditions.

The data in Table 5 reveal that permeability and bulking properties were each improved by treating mercerized fiber samples with resin. In the absence of mill refining (i.e., Revs=0), the Frazier and bulk values were visibly improved for resin-treated samples than for Control Fiber 1. Both the 1% modified melamine and 10% melamine-formaldehyde resin-treated samples demonstrated excellent permeability, having Frazier values of 757 CFM/ft$^2$ or greater, and bulking properties ranging from 7.9 to 8.3 cc/g. The 1% PAE treated sample also exhibited marked improvements in these values over Control Fiber 1, which had much lower permeability and bulking properties at about 300 CFM/ft$^2$ and 6.2 cc/g, respectively.

As expected, PFI mill refining of the samples resulted in lower values for permeability and bulking than without refining, however these values were generally improved over values determined for Control Fiber 1 under the same conditions. Therefore, depending on the extent of PFI mill refining necessary and the permeability and bulking properties desired, one skilled in the art can select from a variety of resins taught by the invention to improve the properties in the fiber selected.

TABLE 5

Resin Evaluation Table

| Resin applied to Control Fiber 1 | Sample | PFI Mill Refined (Revs) | Frazier (CFM/ft$^2$) | Tensile (g/inch) | Bulk (cc/g) |
|---|---|---|---|---|---|
| None | 1A | 0 | 298 | 84 | 6.2 |
| " | 1B | 0 | 301 | 83 | 6.1 |
| " | 1C | 0 | 304 | 77 | 6.3 |
| " | 2A | 500 | 360 | 96 | 6.8 |
| " | 2B | 500 | 360 | 97 | 7.1 |
| " | 2C | 500 | 360 | 109 | 6.8 |
| " | 3A | 1000 | 352 | 142 | 6.8 |
| " | 3B | 1000 | 352 | 131 | 6.9 |
| " | 3C | 1000 | 358 | 112 | 6.8 |
| " | 4A | 1500 | 343 | 180 | 6.9 |
| " | 4B | 1500 | 349 | 157 | 6.6 |
| " | 4C | 1500 | 346 | 157 | 6.9 |
| 1% Modified Melamine Resin | 5A | 0 | >757 | 13 | 8.1 |
| " | 5B | 0 | >757 | 12 | 7.8 |
| " | 5C | 0 | >757 | 12 | 8.1 |
| " | 6A | 500 | 383 | 39 | 7.4 |
| " | 6B | 500 | 398 | 37 | 7.2 |
| " | 6C | 500 | 410 | 37 | 7.4 |
| " | 7A | 1000 | 349 | 99 | 7.1 |
| " | 7B | 1000 | 371 | 87 | 7 |
| " | 7C | 1000 | 363 | 89 | 7.1 |
| " | 8A | 1500 | 328 | 210 | 7 |
| " | 8B | 1500 | 346 | 192 | 7.2 |
| " | 8C | 1500 | 332 | 207 | 7.1 |
| 1% Polyamide Epichlorohydrin Resin | 9A | 0 | 550 | 18 | 8 |
| " | 9B | 0 | 565 | 16 | 7.8 |
| " | 9C | 0 | 568 | 18 | 7.8 |
| " | 10A | 500 | 366 | 78 | 7.1 |
| " | 10B | 500 | 378 | 69 | 7.2 |
| " | 10C | 500 | 347 | 70 | 7.2 |
| " | 11A | 1000 | 331 | 131 | 7 |
| " | 11B | 1000 | 347 | 122 | 7 |
| " | 11C | 1000 | 342 | 116 | 7.1 |
| " | 12A | 1500 | 319 | 220 | 6.8 |
| " | 12B | 1500 | 325 | 215 | 6.9 |
| " | 12C | 1500 | 328 | 211 | 6.9 |
| 10% Melamine-Formaldehyde Resin | 13A | 0 | 757 | 13 | 8.3 |
| " | 13B | 0 | 757 | 13 | 8.3 |
| " | 13C | 0 | 757 | 12 | 7.9 |
| " | 14A | 500 | 497 | 22 | 7.8 |
| " | 14B | 500 | 505 | 20 | 8 |
| " | 14C | 500 | 508 | 18 | 8 |
| " | 15A | 1000 | 425 | 38 | 7.3 |
| " | 15B | 1000 | 413 | 39 | 7.7 |
| " | 15C | 1000 | 422 | 45 | 7.5 |
| " | 16A | 1500 | 383 | 88 | 7.2 |
| " | 16B | 1500 | 398 | 74 | 7.2 |
| " | 16C | 1500 | 395 | 73 | 7.3 |

What is claimed is:

1. A filter paper comprising individualized mercerized resin treated cellulose fibers treated with a low molecular weight, water dispersible polymer resin,
   wherein said resin is present in the amount of between about 0.1 and about 10% solids per dry weight of said cellulose fiber; and
   wherein said resin is polyamide epichlorohydrin adduct.

2. The filter paper of claim 1, wherein said resin is present in the amount of between about 0.1 and about 1.5% solids per dry weight of said cellulose fiber.

3. A method for preparing a cellulosic fiber sheet, which method consists essentially of:
   (a) mercerizing cellulose pulp with a swelling agent at a concentration of at least about 80 grams/liter;
   (b) neutralizing the mercerized cellulose pulp;
   (c) treating the neutralized mercerized pulp with a water dispersible polymer resin, the resin present in an amount of between about 0.1 and 10% solids per dry weight of the cellulose pulp;
   (d) recovering resin-treated, mercerized cellulose fibers from the pulp;
   (e) drying and curing the recovered resin treated mercerized cellulose fibers; and
   (f) preparing a cellulosic fiber sheet from the dried and cured, resin-treated, mercerized cellulose fibers.

4. The method of claim 3, wherein the drying and curing step is accomplished by heating the fibers.

5. The method of claim 4, wherein the heating takes place at about 105° F. to about 300° F.

6. The method of claim 3, wherein the polymer resin is a cationic, wet strength resin.

7. The method of claim 3, wherein the resin is selected from the group consisting of polyamide epichlorohydrin adduct, urea, melamine formaldehyde, and mixtures thereof.

8. The method of claim 7, wherein the resin is polyamide epichlorohydrin adduct.

9. The method of claim 8, wherein the resin is present in an amount of between about 0.1 and about 1.5% solids per dry weight of the cellulose pulp.

10. The method of claim 3, wherein the cellulose pulp is selected from the group consisting of southern softwood kraft, northern softwood kraft, tropical hardwood kraft, northern softwood sulfite, southern softwood sulfite, and cotton linter cellulose.

11. The method of claim 3, wherein the swelling agent is selected from the group consisting of sodium hydroxide, potassium hydroxide, and mixtures thereof.

12. The method of claim 11, wherein the swelling agent is sodium hydroxide.

13. The method of claim 3, wherein the mercerizing step is performed at a temperature of at least 20° C.

14. The method of claim 3, wherein the cellulosic sheet material is a high flow filter.

15. The method of claim 14, wherein the high flow filter is an air filter or an automotive filter.

16. A method for preparing a cellulosic fiber sheet, which method consists essentially of:

(a) introducing mercerizing strength caustic at a concentration of at least about 80 grams/liter to a high consistency cellulose pulp to produce a low consistency slurry;

(b) neutralizing the mercerized cellulose pulp;

(c) introducing to the pulp a resin selected from the group consisting of polyamide epichlorohydrin adduct, urea, melamine formaldehyde, and mixtures thereof, in an amount of between 0.1 to 10 wt. % of dry pulp, and adjusting the pH of the pulp to between about 5.5 and 6.5;

(d) drying the pulp of step (a) with the application of heat to obtain individual-ized, cured fibers; and (e) preparing a cellulosic fiber sheet from the individualized, cured fibers.

17. A fibrous product comprising individualized, mercerized resin treated cellulose fibers treated with a low molecular weight, water dispersible polymer resin, wherein said resin is present in the amount of between about 0.1 and about 10% solids per dry weight of said cellulose fiber; and wherein said resin is polyamide epichlorohydrin adduct.

18. The fibrous product of claim 17, wherein the resin is present in the amount of between about 0.1 and 1.5% solids per dry weight of the cellulose fiber.

19. The fibrous product of claim 17, wherein the fibrous product is filter paper.

20. The fibrous product of claim 19, wherein the fibrous product is high flow filter paper.

21. The fibrous product of claim 20, consisting of an air filter and an automotive filter.

* * * * *

UNITED STATES PATENT AND TRADEMARK OFFICE
CERTIFICATE OF CORRECTION

PATENT NO.    : 6,488,809 B1
DATED         : December 3, 2002
INVENTOR(S)   : Arthur F. Phillips et al.

It is certified that error appears in the above-identified patent and that said Letters Patent is hereby corrected as shown below:

<u>Title page,</u>
Item [62], Related U.S. Application Data, after "Division of application No. 09/163,040 filed September 29, 1998, now Pat. No. 6,171,441," insert -- which claims benefit of 60/060,278 filed September 29, 1997 --

Signed and Sealed this

Seventeenth Day of June, 2003

JAMES E. ROGAN
*Director of the United States Patent and Trademark Office*